US006240179B1

(12) United States Patent
Balatoni et al.

(10) Patent No.: US 6,240,179 B1
(45) Date of Patent: May 29, 2001

(54) VOICE AND DATA COMMUNICATIONS

(75) Inventors: Nicholas A. Balatoni, Santa Clara, CA (US); Jan Erreygers, Tielt-Winge (BE)

(73) Assignee: Terayon Communications Systems, Inc., Santa Clara, CA (US)

( * ) Notice: Subject to any disclaimer, the term of this patent is extended or adjusted under 35 U.S.C. 154(b) by 0 days.

(21) Appl. No.: 08/952,811

(22) Filed: Nov. 25, 1997

Related U.S. Application Data

(63) Continuation of application No. PCT/US96/03727, filed on Mar. 19, 1996, which is a continuation-in-part of application No. 08/408,610, filed on Mar. 20, 1995, now Pat. No. 5,610,922.

(51) Int. Cl.[7] .......................... H04M 3/02; H04M 11/00; H04J 3/12
(52) U.S. Cl. ...................... 379/399; 379/93.07; 370/468; 370/524; 370/535
(58) Field of Search ..................... 379/399, 406, 379/410, 402, 235, 93.08, 93.09, 93.14, 93.15, 93.05–93.07; 370/468, 524, 535, 522

(56) References Cited

U.S. PATENT DOCUMENTS

| 4,740,963 | * | 4/1988 | Eckley | 370/522 |
|---|---|---|---|---|
| 4,751,696 | * | 6/1988 | Black | 379/235 |
| 4,924,492 | * | 5/1990 | Gitlin et al. | 379/93.08 |
| 4,993,063 | * | 2/1991 | Kiko | 379/405 |
| 5,303,267 | * | 4/1994 | Gupta | 375/260 |
| 5,459,729 | * | 10/1995 | Bliven | 370/465 |

* cited by examiner

Primary Examiner—Wing F. Chan (57) ABSTRACT

A method and apparatus for converting an analog voice channel signal and a 4-wire digital signal into a single 2-wire digital signal which can be transferred over a single twisted pair line. In one aspect, the method comprises the steps of converting the analog voice channel signal into a first binary signal, converting the 4-wire digital signal into a second binary signal, combining the first binary signal and the second binary signal into a higher rate binary signal, and converting the higher rate binary signal into a 2-wire digital signal which can be transmitted to another location over a single twisted pair line. In another aspect, the method comprises the steps of converting a 2-wire digital signal to a higher rate binary signal, separating a first binary signal and a second binary signal from the higher rate binary signal and converting the first binary signal into an analog voice channel signal, and converting the second binary signal into a 4-wire digital signal. The apparatus includes an easily installed voice plus digital data remote terminal and voice plus digital data central office terminal. The apparatus can provide a 3-to-1 pair gain by multiplexing signals representing the analog voice telephone signals and 4-wire digital data signals.

4 Claims, 6 Drawing Sheets

VOICE AND DATA COMMUNICATIONS

CROSS-REFERENCE TO RELATED APPLICATIONS

This is the national stage of International Application No. PCT/US96/03727, filed Mar. 19, 1996, which is a continuation-in-part application of U.S. application Ser. No. 08/408,610, filed Mar. 20, 1995, now U.S. Pat. No. 5,610,922, the disclosure of each of which is incorporated herein by reference.

BACKGROUND OF THE INVENTION

Much electronic data processing equipment, e.g. telephones, computers and facsimile machines, makes use of 4-wire digital signals (often referred to in North America as digital data services, or DDSs). Transmission of such signals requires four wires which have no abrupt changes in impedance. For example, if existing telephone lines are to be used for 4-wire digital services, they must undergo testing and modification (often referred to as Class C3 data conditioning). This is a serious disadvantage, even if four telephone lines are available, which is not always the case. In addition, repeaters are often needed. For example, one typical 4-wire signal is a bipolar signal at a transmission rate of up to 56 kbps. Such signals typically need a repeater if the line span exceeds 3000 to 3,650 meters (10,000 to 12,000 feet). A further difficulty is that it is difficult to combine conventional analog telephone service (POTS) with 4-wire digital service.

SUMMARY OF THE INVENTION

We have discovered, in accordance with the present invention, how to transfer a 4-wire digital signal and an analog voice channel signal over a simple 2-wire cable, for example a single twisted pair. Thus, in a first preferred aspect this invention provides a method of converting an analog voice channel signal and a 4-wire digital signal into a single signal which can be transferred over a single twisted pair line, the method comprising the steps of:

a. converting the analog voice channel signal into a first binary signal;
b. converting the 4-wire digital signal into a second binary signal;
c. combining the first binary signal and the second binary signal into a higher rate binary signal; and
d. converting the higher rate binary signal into a 2-wire digital signal.

In a second preferred aspect, this invention provides a method of transferring an analog voice channel signal and a 4-wire digital signal from a first location to a second location over a single twisted pair line between the locations, the method comprising:

e. at one of the locations, converting an analog voice channel signal and a 4-wire digital signal into a 2-wire digital signal by the method of the first aspect of the invention;
f. transferring the 2-wire digital signal from step (e) over the single twisted pair line to the other location; and
g. at the other location,
  i. converting the 2-wire digital signal from step (f) to a higher rate binary signal,
  ii. separating a first binary signal and a second binary signal from the higher rate binary signal produced in step (g(i)), and
  iii. converting the first binary signal obtained in step (g(ii)) into an analog voice channel signal, and converting the second binary signal obtained in step (g(ii)) into a 4-wire digital signal.

Typically, one of the locations will be a telephone company location and the other location will be a customer premises. In most cases, step (g) will recreate the analog and digital signals which were converted in steps (a) and (b), and will do so through the same higher rate binary signal, first binary signal and second binary signal. However, the invention includes the possibility that one or more of the signals in step (g) is related to, but not identical to, the corresponding signal in steps (a) through (d). In most cases, steps (e), (f) and (g) will be carried out at both locations, so that 2-wire digital signals are transferred in both directions down the twisted pair.

In a third preferred aspect, the invention provides apparatus which is suitable for use in the method of the first preferred aspect of the invention and which comprises:

1. means for receiving an analog voice channel signal;
2. means for receiving a 4-wire digital signal;
3. means for converting the analog voice channel signal into a first binary signal;
4. means for converting the 4-wire digital signal into a second binary signal;
5. means for combining the first binary signal and the second binary signal into a higher rate binary signal;
6. means for converting the higher rate binary signal into a 2-wire digital format; and
7. means for transferring the 2-wire digital signal to a single twisted pair line.

In a fourth preferred aspect, the invention provides apparatus which is suitable for use at the other location in the method of the second preferred aspect of the invention and which comprises:

1. means for receiving a 2-wire digital signal;
2. means for converting the 2-wire digital signal into a higher rate binary signal;
3. means for separating a first binary signal and a second binary signal from the higher rate binary signal;
4. means for converting the first binary signal into an analog voice channel signal; and
5. means for converting the second binary signal into a 4-wire digital signal.

In a fifth preferred aspect, the invention provides apparatus which combines the apparatus of the third and fourth aspects of the invention, and which is, therefore, suitable for use at both locations when signals are transferred in both directions.

DETAILED DESCRIPTION OF THE INVENTION

The 4-wire digital signal which is converted by the method of the invention may be, for example, a bipolar signal from a digital data service (DDS) channel. The digital signal may include a video, data or voice signal, typically at a signaling rate of 2.4 kbps, 4.8 kbps, 9.6 kbps, 19.2 kbps, 56 kbps or 64 kbps.

The analog voice channel signal is typically a voice signal, but can be another analog signal.

In one embodiment, the higher rate binary signal has a bit rate of 256 kbps and the 2-wire digital signal has a bit rate of 160 kbps. In another embodiment, the 2-wire digital signal has a bit rate of 288 kbps, 416 kbps, 784 kbps or 1168 kbps. The 2-wire digital signal preferably has a 2B1Q format or a 4B3T format.

The invention is particularly useful when the twisted pair is at least 5,486 meters (18,000 feet) long and comprises wires of different gauges, because it is particularly difficult to use such wires as part of a conventional 4-wire system.

Because it is highly desirable for a conventional telephone link to be available if the system malfunctions, the invention preferably includes means for transferring the analog voice channel signal directly to the twisted pair telephone line.

Specific embodiments of the invention will now be described by reference to the drawings.

Figure 1:
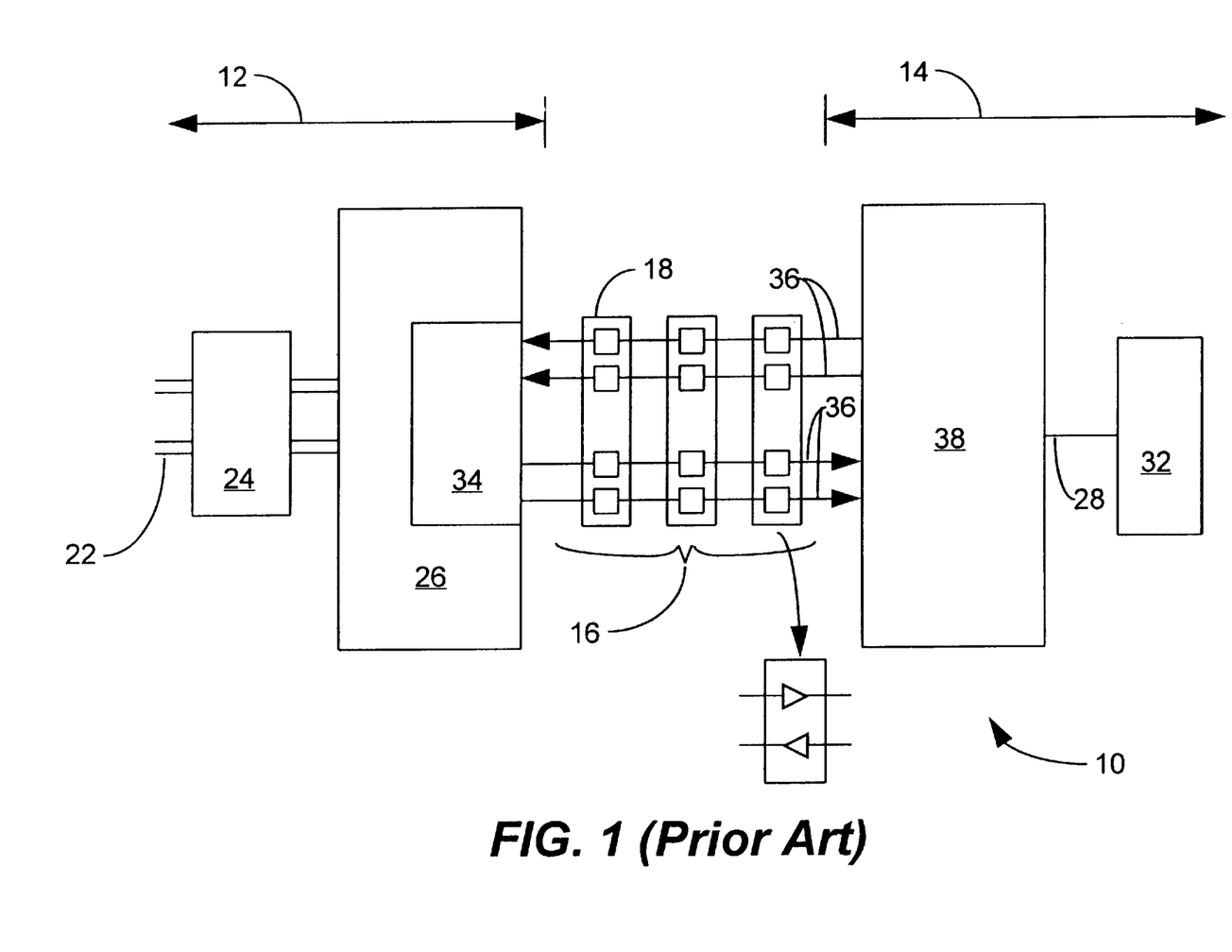
FIG. 1 is a block diagram for a known 4-wire DDS circuit.

FIG. 1 is a block diagram for a known 4-wire DDS circuit 10 deployed over a local loop between a central office 12 and a customer premises 14. Between the central office 12 and the customer premises 14 is a 4-wire local loop 16. At the central office 12, the conventional 4-wire DDS is coupled to T1 facilities 22, and includes a digital switch (or cross-connect) 24, and a channel bank 26.

In North America, a conventional channel bank generally contains 24 channels, and a conventional channel bank in Europe generally contains 30 channels. The channel bank can also include a multiplicity of office channel unit/data ports (OCU/DP) 34 to provide data signals to the 4-wire local loops. A conventional channel bank can be a D4 channel bank.

The 4-wire local loop 16 between the OCU/DP 34, at the central office 12, and the data service unit/channel service unit (DSU/CSU) 38, at the customer premises 14, includes two twisted pairs 36, with each twisted pair comprising two wires. The 4-wire local loop 16 also includes repeaters 18. The repeaters 18 are placed onto the 4-wire local loop 16 about every 10–12 kft of line span to regenerate the bipolar digital pulses. The number of repeaters 18 placed on to the 4-wire local loop 16 depends upon the total line span or length.

At the customer premises 14, the 4-wire DDS includes a DSU/CSU 38, a line interface 28, and a data terminal equipment (DTE) 32. The CSU terminates the digital circuit at the customer premises and performs functions such as line conditioning, remote loopback testing, signal regeneration, and monitoring of the incoming digital signal to detect violations of rules governing the transmission of data on the 4-wire digital facility. The combined DSU/CSU 38 converts the bipolar data format from the 4-wire local loop 16 into a format such as RS-232C or V.35 for use at the DTE 32. The DSU/CSU 38 also converts the signal from the DTE 32 into the bipolar data format for use on the 4-wire digital facility.

In one embodiment of the invention, the voice plus 4-wire DDS delivers a 4-wire DDS signal and a voice channel from a telephone company central office to a customer premises over a single twisted pair of telephone wires.

Figure 2:
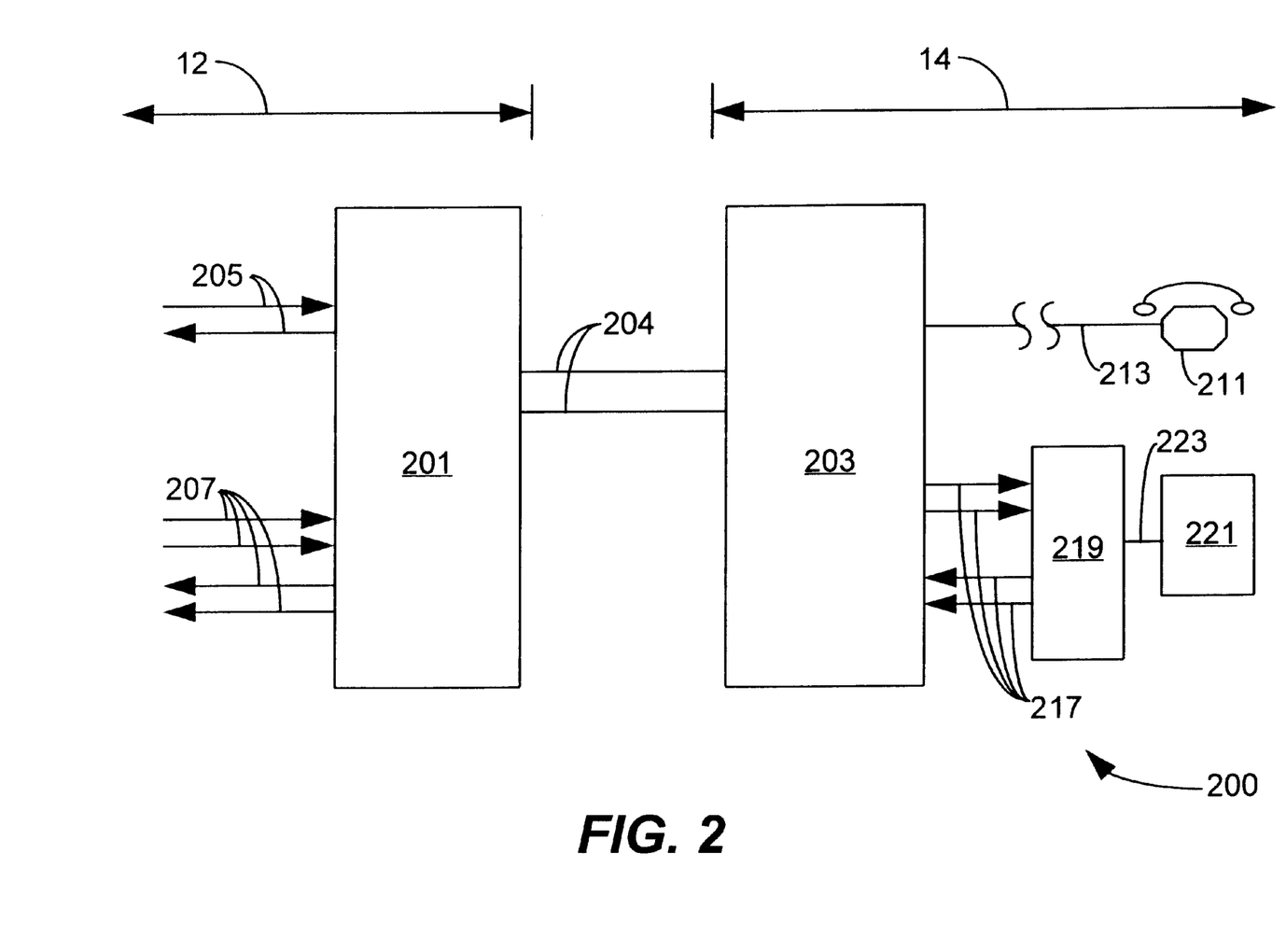
FIGS. 2 and 2a are block diagrams of a voice plus 4-wire digital data service system according to the invention.

FIG. 2 is a block diagram for a voice plus 4-wire DDS system 200 according to the invention. The voice plus 4-wire DDS system 200 includes a voice plus digital data central office terminal (VF Plus DD COT) unit 201 (e.g., line card) at a central office location 12 and a voice plus digital data service remote terminal (VF Plus DD RT) 203 at a customer premises 14. VF Plus DD COT 201 receives and transmits analog signals VF via lines 205 and 4-wire DDS signals via lines 207. VF Plus DD RT 203 receives and transmits analog telephone signals via line 213 from and to telephone 211. VF Plus DD RT 203 also receives and transmits data signals from DTE 221 via a DSU/CSU 219 via lines 217. The DSU/CSU 219 converts the 4-wire data signals into a signal compatible with the DTE 221. The compatible signal includes RS-232C, V.35, and others.

The VF Plus DD COT 201 and VF Plus DD RT 203 are preferably detachable units which may be easily installed at the telephone company and customer locations, respectively.

Between the VF Plus DD COT 201 and the VF Plus DD RT 203 is a digital subscriber line 204 which is a single twisted pair telephone line. The digital subscriber line 204 transmits multiplexed digital data through the single twisted pair at 160 kbps in a 2B1Q data format, without the use of repeaters, for a typical 18 kft mixed gauge line span. Alternatively, the digital data format may be 4B3T and others.

Figure 3:
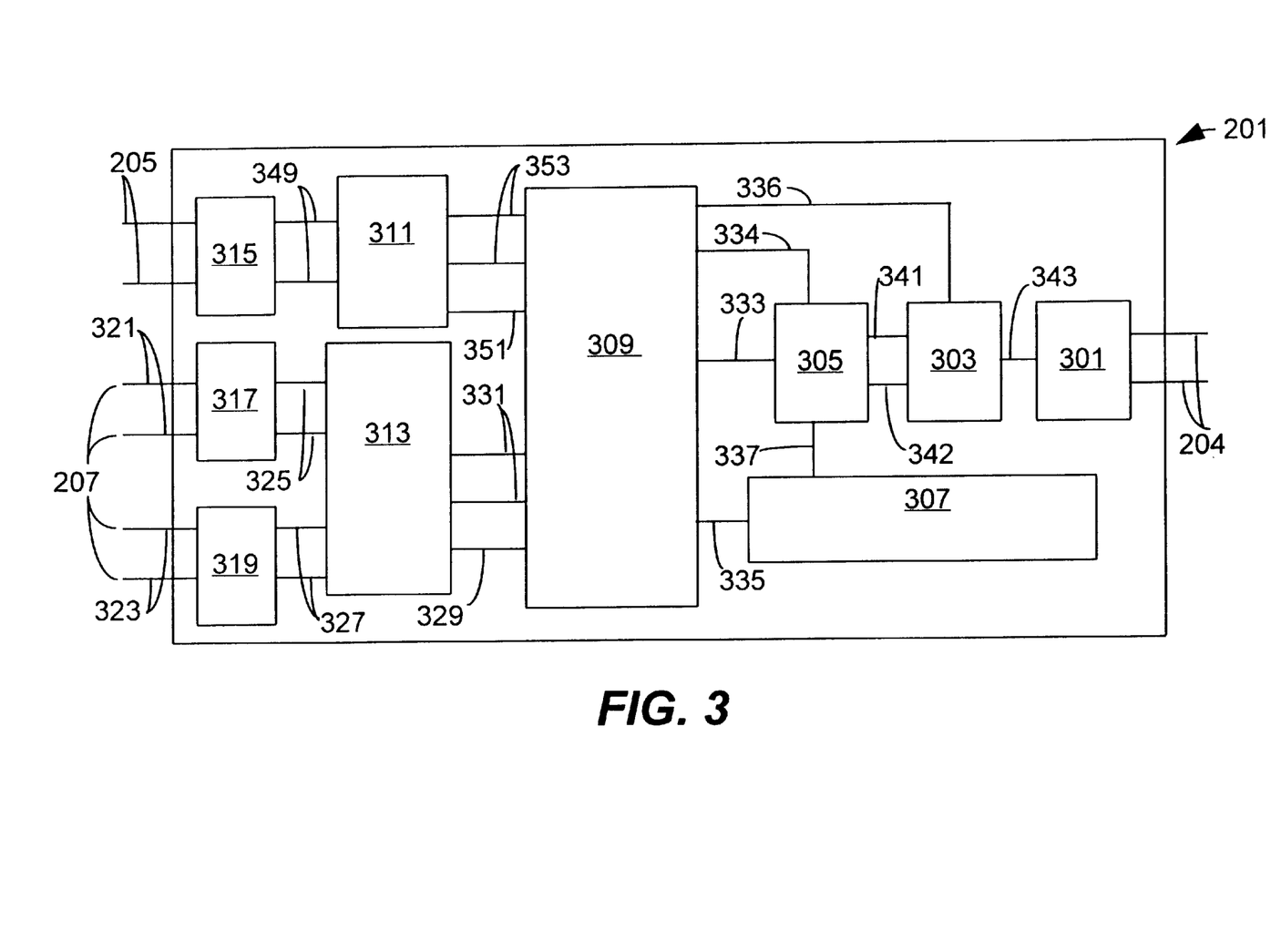
FIG. 3 is a block diagram of a voice plus digital data central office terminal unit according to the invention.

FIG. 3 illustrates a block diagram of a VF Plus DD COT 201 according to the invention. The VF Plus DD COT 201 includes a digital subscriber line transformer (DSL Xfmr) 301, an ISDN echo cancellation-quaternary (IECQ) circuit 303, an ISDN communications controller (ICC) circuit 305, a microprocessor 307, a custom integrated circuit 309, a coder-decoder (CODEC) filter 311, a digital data service transceiver (DDS-B) 313, a hybrid transformer (Hybr. Xfmr) 315, data transformers (Data Xfmr(s)) 317, 319, among other elements.

Outgoing 4-wire DDS signals (CO DDS Rcv) enter the Data Xfmr 317 via lines 321 from a channel bank in the central office. The Data Xfmr 317 and associated resistive elements (not shown) isolate, condition, and impedance match the outgoing 4-wire DDS signals for use in the DDS-B 313. The outgoing 4-wire DDS signals from the Data Xfmr 317 enter the DDS-B 313 via lines 325.

The DDS-B 313 performs selected clock recovery and data formatting operations.

In particular, the DDS-B 313 recovers a clock (Clk) signal from the transmitted outgoing 4-wire signal from the Data Xfmr 317 for use by the custom integrated circuit 309 and other circuit elements via line 329. The clock signal is preferably at a signal rate of 56 kHz from a dedicated 56 kbps DDS or a switched 56 kbps service. The DDS-B 313 also converts the 4-wire outgoing signal from the Data Xfmr 317 from the bipolar signal into a unipolar binary TTL signal defined by D+ and its inversion D− for use at the custom integrated circuit 309 via lines 331. The D+ and the D− signals also provide certain error monitoring and correction features and the like.

Outgoing analog signals such as voice and the like exit a central office two wire POTS interface circuit via lines 205 and enter a hybrid transformer 315. The hybrid transformer 315 isolates, conditions, impedance matches, and separates the outgoing analog signals into send and receive direction signals for transmission to the CODEC filter 311 over lines 349. The hybrid transformer 315 also converts the outgoing analog signals from a 2-wire format into a 4-wire format.

The CODEC filter 311 converts the received analog signals from the hybrid transformer 315 into a PCM encoded digital signal using a sampling rate at 8,000 times per second at 8-bits per sample. (The CODEC filter 311 also converts the PCM encoded digital signal into an analog signal in the reverse direction.) The encoded digital signal exits the CODEC filter 311 as a unipolar TTL binary signal defined by D+ and D− via lines 353. The D+ and D− signals also provide for features such as monitoring, error correction, and the like. The CODEC filter 311 receives a 64 kHz clock (Clk) signal via line 351 from the custom integrated circuit 309. The clock signal may be derived from the synchronizing clock signal captured from any clock source in the central office.

The custom integrated circuit 309 provides selected data handling and clocking features. The custom integrated circuit 309 is typically an application specific integrated circuit (ASIC) such as a gate array, a field programmable gate array, or the like. In one embodiment, the custom integrated circuit 309 is a Xilinx 3000 Series Programmable Gate Array, however, other types of integrated circuit(s) and the like may also be used.

The custom integrated circuit 309 uses a phase-locked loop (PLL) to synchronize the clock (Clk) from the DDS-B 313 with its internal clocks. The custom integrated circuit receives the 56 kHz clock signal from the DDS-B 313, divides the 56 Hz clock signal down to an 800 Hz clock signal, and increases the 800 Hz clock signal to provide other selected clock frequencies by way of a two phase PLL configuration. For example, a first PLL inputs the 800 Hz signal and outputs a 512 kHz signal, and a second PLL inputs the 512 KHz signal and outputs a 15.360 MHz signal. The 512 kHz clock enters the ICC 305 via line 334. The 15.360 MHz clock and the 512 kHz clock enter the IECQ 303 via line 336. The PLL configuration provides a clock signal at a rate of 64 kHz also for use by the CODEC filter 311.

The custom integrated circuit 309 also uses the 64 kHz clock signal to build the D+ and D− signals corresponding to the signals from the CODEC filter 311 and the DDS-B 313 into two 64 kbps data signals. The two 64 kbps data signals are multiplexed together with two other 64 kbps signals corresponding to a control & information (C & I) channel, and a monitor channel. The total bit rate of the outgoing signal from the four 64 kbps signals adds to 256 kbps, a corresponding incoming signal also adds to 256 kbps, thereby requiring the use of the 512 kHz clock signal for synchronization.

The outgoing signal is bi-directionally "ping-ponged" at a transmission rate of 512kbps, and enters the ICC 305 via line 333. The outgoing signal enters the ICC 305 arranged as 8 bits of data from a first channel, 8 bits of data from a second channel, 8 bits of control and information (C & I) data, and 8 bits of monitor signal data, and then repeats in the other direction, permitting substantially simultaneous transmission/reception of the digitized voice signals and data signals. The ICC 305 converts the stream of data from the custom integrated circuit 309 into two unidirectional 256 kbps binary TTL signals going to and from the IECQ 303. The ICC 305 operates at a clock signal (CLK) at, for example, 512 kHz and a fame control signal (FSC) at, for example, 8 kHz. The CLK and FSC are provided from the custom integrated circuit 309 via line 334. Monitor data, ring data, and other data which the microprocessor 307 polls are made available to the microprocessor 307 via lines 337 and 335.

The IECQ 303 converts the 256 kbps binary signals it receives from the ICC 305 via line 341 to an outgoing 2B1Q data signal at 160 kbps. The IECQ 303 sends the outgoing data signal via line 343 into the DSL Xfmr 301 which conditions and impedance matches the data signals for transmission over the digital subscriber line 204. The span of the digital subscriber line 204 may be up to 18 kft of typically mixed $24/26$ gauge twisted pair lines without the use of any repeaters or the like. At wire gauges larger than $24/26$ gauge, the span may be up to 33 kft and even greater.

Incoming signals from the digital subscriber line 204 at the VF Plus DD COT 201 are processed in a similar but reverse method as the outgoing signals described above. In particular, a 2B1Q signal enters the DSL transformer 301 via lines 204 which isolates, conditions, and impedance matches the 160 kbps 2B1Q signal for use in the IECQ 303.

The 160 kbps 2B 1Q signal enters the IECQ 303 via line 343. The IECQ 303 converts the 2B1Q signal into a binary signal at a transmission rate of 256 kbps for use in the ICC 305 via line 342. The ICC 305 sends data in the form of four 8-bit words to the custom integrated circuit 309 over line 333.

The custom integrated circuit 309 separates the four 8-bit words into binary TTL signals corresponding to the 4-wire DDS signal, the analog voice signal, the C & I signal, and the monitor signal. The 4-wire DDS binary TTL is transferred from the custom integrated circuit 309 into the DDS transceiver 313 via lines 331. The DDS transceiver 313 converts the binary TTL signals into the 4-wire DDS signal and transmits the 4-wire DDS signal via lines 327 to the data transformer 319 at the desired DDS sub-rate.

Incoming 4-wire DDS signals leave the data transformer 319 via lines 323 to the channel bank 219 (FIG. 2). A binary TTL signal representing the analog voice signal enters the CODEC filter 311 via lines 353 as D+ and D− from the custom integrated circuit 309. The CODEC filter 311 converts the binary TTL data signal into an analog voice signal for transmission via lines 349 to the hybrid transformer 315. The hybrid transformer 315 conditions the analog voice signal and transmits the conditioned analog voice signal via lines 205 to the channel bank 219 (FIG. 2).

Figure 4:
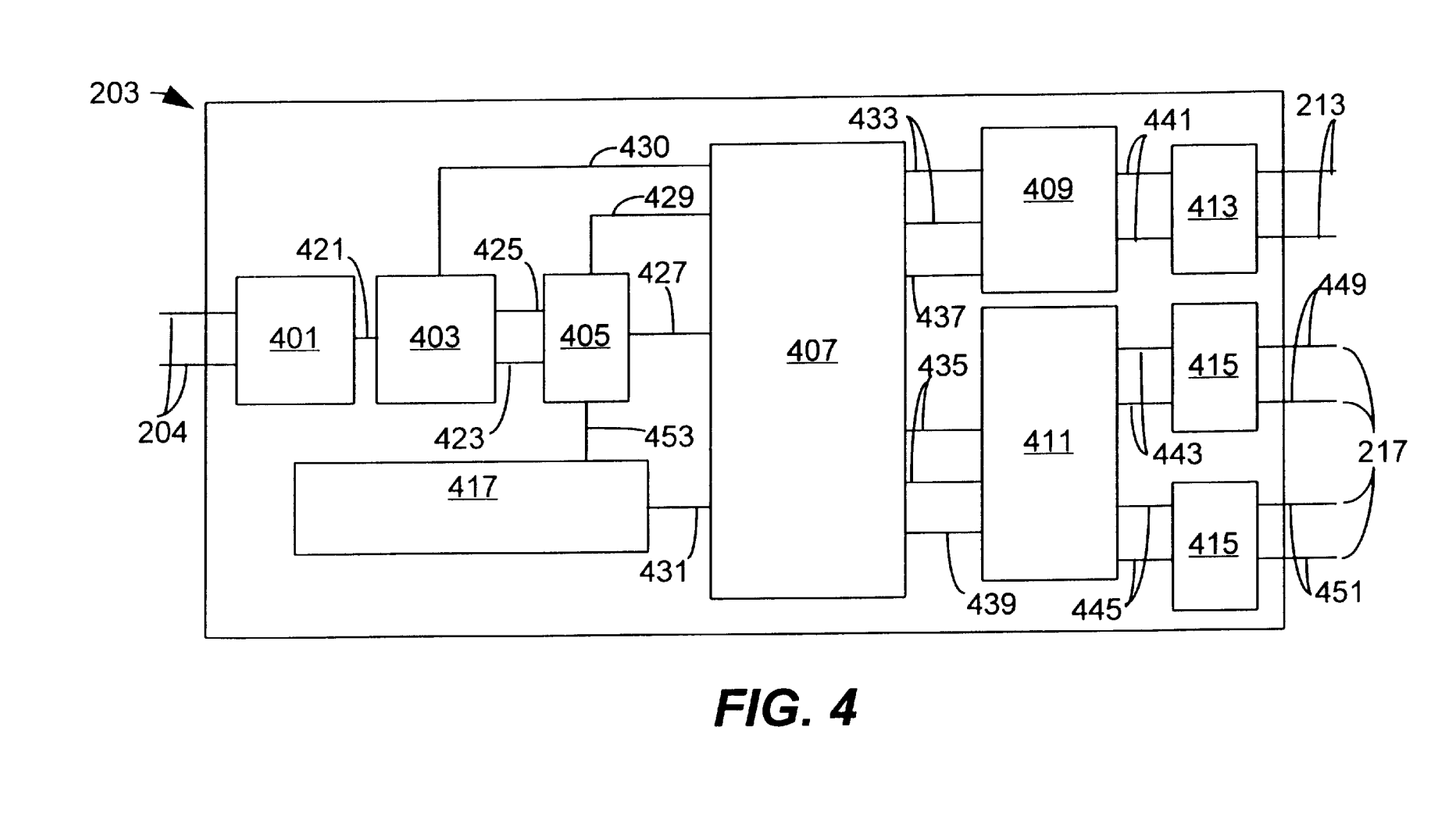
FIG. 4 is a block diagram of a voice plus digital data service remote terminal.

FIG. 4 illustrates a diagram of VF Plus DD RT 203 according to the invention. The VF Plus DD RT 203 includes system elements such as a digital subscriber line transformer (DSL Xfmr) 401, an IECQ 403, an ICC 405, a custom integrated circuit 407, a CODEC filter 409, a DDS transceiver (DDS-B) 411, a subscriber loop interface circuit (SLIC) 413, data transformers 415, a microprocessor 417 and other elements. The VF Plus DD RT 203 is coupled to the digital subscriber line 204, and is coupled to the lines 217 for the 4-wire DDS signals. The VF Plus DD RT is also coupled to tip (T) and ring (R) lines 213.

Incoming 160 kbps 2B 1Q signals from the digital subscriber line 204 enter the DSL transformer 401. The DSL transformer 401 and associated resistive elements (not shown) isolate, condition, and impedance match the 2B1Q signal from the digital subscriber line 204 for use by the IECQ 403. The 2B1Q signals enter the IECQ 403 from the DSL transformer 401 via line 421. The IECQ 403 converts the 160 kbps 2B 1Q signal into a unidirectional binary signal at 256 kbps for transmission through line 423 to the ICC 405. The unidirectional binary signal includes user data and control data. The IECQ 403 uses 512 kbps and 8 kbps clocks from the custom integrated circuit 407 via line 430 for clocking the signal conversions. The 512 kbps and 8 kbps clocks are synchronized from the incoming 160 kbps 2B1Q signal at the digital subscriber line 204. The ICC 405 converts the 256 kbps binary signal from the IECQ 403 into one half of a 512 kbps bi-directional "ping-ponged" bit stream for use at the custom integrated circuit 407 via line 427.

The custom integrated circuit 407 in the VF Plus DD RT 203 operates in a similar manner as in the VF Plus DD COT 201. The custom integrated circuit 407 provides clocking and data handling features. In one embodiment, the custom integrated circuit 407 is a Xilinx 3000 Series Programmable Gate Array, however, other integrated circuit devices may also be used.

In the VF Plus DD RT 203, the custom integrated circuit 407 phase locks its internal clocks to the incoming 160 kbps 2B1Q signal and provides for selected clock frequencies. For example, the custom integrated circuit 407 provides a sub-rate transmit clock (Clk) for the 4-wire DDS signal to the DDS-B 411 via line 439. The custom integrated circuit 407 also provides signals at 64 kbps, 512 kbps, and 15.360 Mbps for its own use and for the ICC 405, the IECQ 403, and other circuits. The custom integrated circuit 407 relies upon a dual PLL arrangement to provide its clocking features.

Besides clocking features, the custom integrated circuit 407 transmits and receives the 512 kbps bi-directional "ping-ponged" signal to and from the ICC 405. The 8-bit words contained therein are demultiplexed into four 64 kbps binary TTL signals, representing the 4-wire DDS signal, the analog signal, the C & I signal, and the monitor signal.

The user data signal representing the analog signal enters the CODEC filter 409 via lines 433. The CODEC filter 409 receives upon the 64 kbps clock signal (Clk) from the custom integrated circuit 407 via line 437 to convert the binary TTL signal into an analog signal. The analog signal from the CODEC filter 409 enters the SLIC 413 via lines 441. The SLIC conditions the analog telephone signal for use at a telephone and the like.

The user data signal at 64 kbps representing the 4-wire DDS signal enters the DDS-B 411 via lines 435. The DDS-B 411 receives the clock signal (Clk) from the custom integrated circuit 407 via line 439 and uses the clock signal to convert the binary TTL data into the 4-wire DDS signal. The custom integrated circuit 407 generates a sub-rate clock signal used by the DDS-B 411 to clock the data out through the data transformer 415. The 4-wire DDS signal from the DDS-B 411 enters the data transformer via lines 443. The data transformer and associated resistive elements (not shown) isolate, condition, and impedance match the 4-wire DDS signal for the DSU/CSU 219 via lines 449. The DSU/CSU 219 converts the 4-wire DDS signals into signals such as RS-232C, V.35, or the like compatible for use at the DTE 221.

Outgoing signals are processed through the VF Plus DD RT 203 in a similar but reverse method as the incoming signals. The 4-wire DDS signal originates at the DSU/CSU 219 and enters the data transformer 415 via lines 451. The data transformer 415 and associated resistive elements (not shown) isolate, impedance match, and condition the 4-wire DDS signal for the DDS-B 411 via lines 445. The DDS-B 411 converts the 4-wire DDS signal from the data transformer 415 into a binary TTL signal for transmission to the custom integrated circuit 407 via lines 435.

The outgoing analog signal from a telephone enters via lines 213 and enters the SLIC 413. The SLIC conditions the analog signal for the CODEC filter 409 and transmits the signal via lines 441. The CODEC filter 409 converts the analog signal from the SLIC into a digital signal. The digital signal enters the custom integrated circuit 407 via lines 433 and clock (Clk) 437.

The custom integrated circuit 407 receives clocking signals from line 429 and converts the digital signals from the CODEC filter 409 and the DDS-B 411 into two 64 kbps signals which define two user data signals. The C & I signal and the monitor signal each at 64 kbps are multiplexed into the two user data signals to provide the 512 kbps "ping-ponged" bi-directional bit stream from the custom integrated circuit 407 to the ICC 405 via line 427. The ICC 405 converts the user data and selected control data at 512 kbps into two unidirectional 256 kbps binary signals representing the incoming and the outgoing signals. The outgoing 256 kbps signal from the ICC 405 enters the IECQ 403 via line 425. The IECQ 403 converts the 256 kbps binary signal into a quaternary signal in the 2B1Q format at a transmission rate of 160 kbps. The 2B1Q formatted outgoing signal from the IECQ 403 enters the DSL transformer 401 via line 421. The DSL transformer 401 and associated resistive elements (not shown) isolate, impedance match, and condition the outgoing 2B1Q formatted signal for transmission over the digital subscriber line 204 which is a single twisted pair telephone line. Monitor data, ring data, and other data which the microprocessor 417 polls are made available to the microprocessor 417 via lines 431 and 453.

Without in any way limiting the scope of the invention, Table 1 provides a list of commercially available components which are useful in the operation of the VF Plus DD RT 203 and VF Plus DD COT 201 according to the above embodiment. The components listed in Table 1 are representative of those which may be used in association with the invention herein and are provided for the purpose of facilitating assembly of an apparatus in accord with the invention. A variety of known components could readily be substituted or functionality could be combined or even separated. CMOS-based integrated circuits have been utilized where possible so as to reduce power consumption of the RT in particular.

TABLE 1

VF Plus DD RT Components

| Component | Part Numbers |
| --- | --- |
| DSL Xfmr | Standard 2B1Q Transformer |
| IECQ | Siemens 2091 |
| ICC | Siemens 2070 |
| Custom IC | Xilinx 3000 Series |
| Transceiver | Level One LXT 400 |
| CODEC Filter | Fujitsu MB6021 |
| Data Transformer | TMC 5730 or Midcom 671-6390 |
| Hybrid Transformer | Standard Voice Frequency Hybrid Transformer |
| SLIC | Erickson PBL 3764 |
| Microprocessor | Intel 87C51FA |

Figure 5:
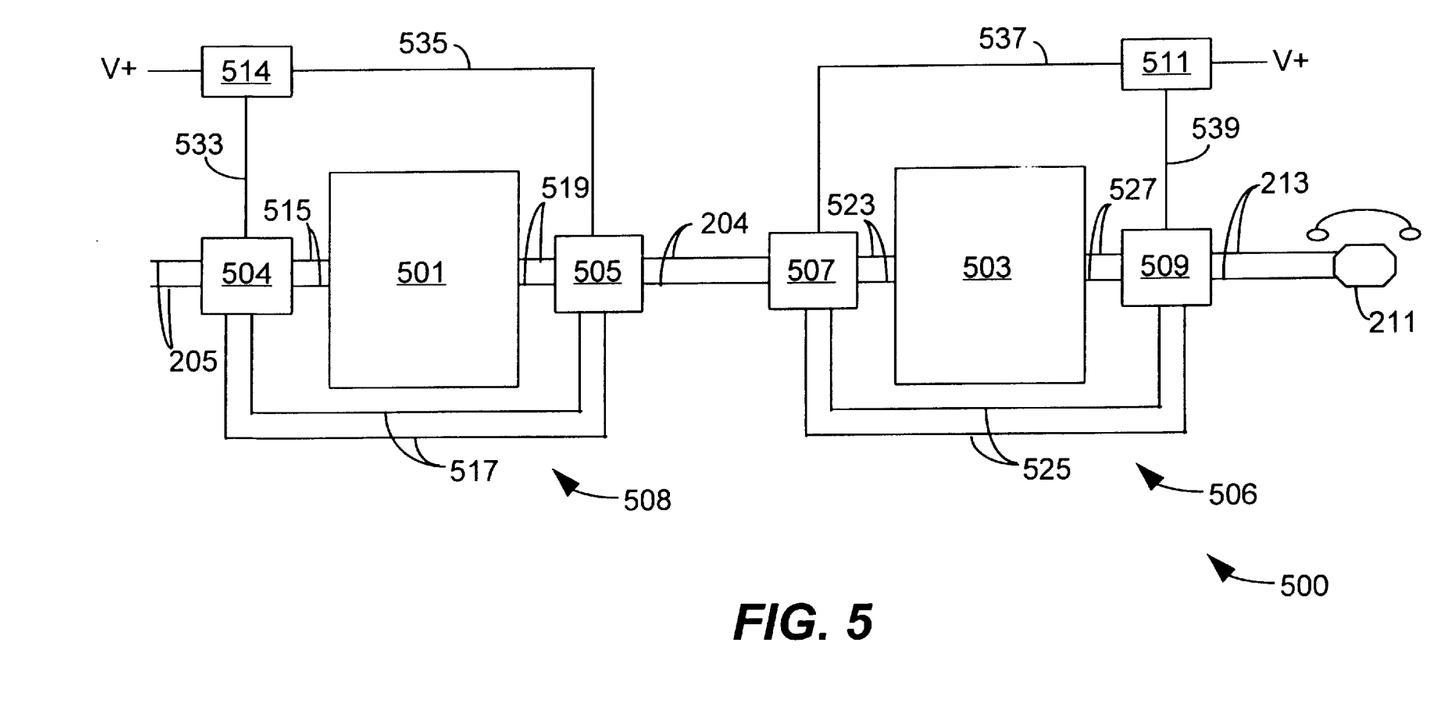
FIG. 5 is a block diagram of bypass circuits according to the invention.

The system described above includes bypass circuits to change the multiplexed digital use of the single twisted pair to the transmission of POTS if the simplexed power, i.e. power passed from the VF plus DD COT 201 to the VF plus DD RT over the twisted pair, is lost. FIG. 5 is a block diagram of the bypass circuits 500 according to the invention. The block diagram includes VF Plus DD COT normal mode circuit elements 501 and VF Plus DD RT normal mode circuit elements 503. The normal mode circuit elements are similar to the elements in the VF Plus DD COT 201 and the VF Plus DD RT 203 described above. During normal operation the bypass circuits allow the incoming analog telephone signal in line 205 to operate with the normal mode circuit elements of the VF Plus DD COT 201 via lines 515, 519 and the VF Plus DD RT 203 via lines 523, 527.

A loss of simplexed power at the VF Plus DD COT bypass circuit 508 bypasses the incoming analog telephone signal from line 205 around the normal mode VF Plus DD COT circuit elements 501 to the outgoing twisted pair telephone line 204. The voltage V+ at a voltage sensor 514 goes to zero, and the voltage sensor 514 sends control signals via lines 533 and 535 to switches 504 and 505, respectively, to bypass the incoming analog telephone signals to lines 517. The switches 504 505 isolate the bypassed analog telephone signal from the normal mode circuit elements 501.

The VF Plus DD RT bypass circuit 506 operates in a similar manner. Since the VF Plus DD RT 203 receives its power from the twisted pair 204 during normal mode operation, a power failure at the VF Plus DD COT 201 also results in power failure at the VF Plus DD RT 203. During power failure, the incoming analog telephone signal from the twisted pair telephone line 204 bypasses the normal mode circuit elements 503 to a telephone 211. Voltage V+ at the voltage sensor 511 goes to zero during the power failure, and control signals via lines 537 and 539 enter switches 507 and 509, respectively. The switches 507 509 bypass the incoming analog telephone signal from the twisted pair 204 via lines 525 to the telephone 211. The switches 507 509 also isolate the normal mode circuit elements 503 from the bypassed analog telephone signals. The VF Plus DD RT and the VF Plus DD COT bypass circuits 508 506 allow the user to rely upon POTS during a power failure. Alternatively, an inability to sustain a linked condition between the normal mode VF Plus DD RT circuit 503 and the normal mode VF DD COT circuit 501 results in the bypass circuits re-directing the analog phone signal in a similar manner. The bypass circuits may be used to bypass the analog phone signal for other reasons.

Figure 2A:
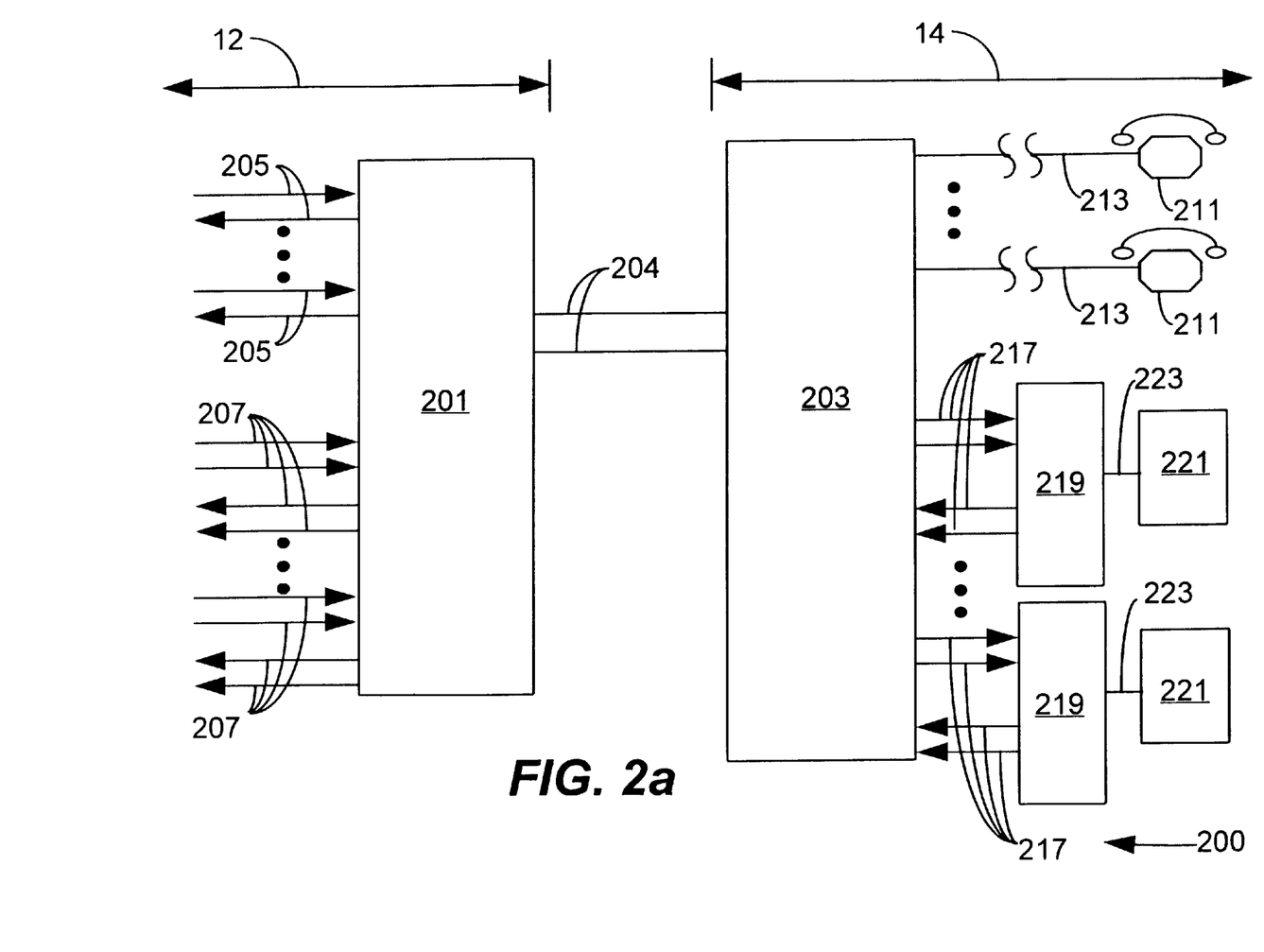

The present invention can be used to transmit one or more voice channels and one or more data channels over one twisted pair as shown in FIG. 2a. The digital signal that is being transmitted from the telephone company location to the subscriber premises can be at bit rates such as 288 kbps, 416 kbps, 784 kbps and 1168 kbps. Integrated circuits are available to do this using the HDSL transmission technology. In analogy with the embodiment described above, one or more voice channels can be converted to first binary signals and one or more 4-wire data signals can be converted to second binary signals. All these first and second binary signals can be multiplexed into one higher rate binary signal. This higher rate binary signal can be converted in a digital signal using, e.g. the 2B 1Q transmission code at 144 ksymbols/s, 158 ksymbols/s, 392 ksymbolsls, 584 ksymbols/s, etc. At the remote terminal this digital signal is converted to a higher rate binary signal. This higher rate binary signal is then separated into first and second binary signals. The first binary signals are converted to analog voice channels for transmission over twisted pairs towards subscriber equipment. The second binary signals are converted to 4-wire digital data circuits for transmission towards subscriber equipment.

What is claimed is:

1. An apparatus for converting analog voice channel signals and 4-wire digital signals into a single signal which can be transferred over a single twisted pair line, comprising:

means for receiving a first analog voice channel signal;

means for receiving a second analog voice channel signal;

means for receiving a first 4-wire digital signal;

means for receiving a second 4-wire digital signal;

means for converting the first analog voice channel signal and the second analog voice channel signal into a first binary signal;

means for converting the first 4-wire digital signal and the second 4-wire digital signal into a second binary signal;

means for combining the first binary signal and the second binary signal into a higher rate binary signal;

means for converting the higher rate binary signal into a 2-wire digital signal; and means for transferring the 2-wire digital signal to a twisted pair line.

2. An apparatus for receiving analog voice channel signals and 4-wire digital signals via a 2-wire digital signal which can be transferred over a single twisted pair line, comprising:

means for receiving a 2-wire digital signal;

means for converting the 2-wire digital signal into a higher rate binary signal;

means for separating a first binary signal and a second binary signal from the higher rate binary signal;

means for converting the first binary signal into a first analog voice channel signal and a second analog voice channel for transmission to subscriber equipment; and means for converting the second binary signal into a first 4-wire digital signal and a second 4-wire digital signal for transmission to subscriber equipment.

3. A method for converting analog voice channel signals and 4-wire digital signals into a single signal transferable over a single twisted pair line, comprising:

receiving a first analog voice channel signal;

receiving a second analog voice channel signal;

receiving a first 4-wire digital signal;

receiving a second 4-wire digital signal;

converting the first analog voice channel signal and the second analog voice channel signal into a first binary signal;

converting the first 4-wire digital signal and the second 4-wire digital signal into a second binary signal;

combining the first binary signal and the second binary signal into a higher rate binary signal;

converting the higher rate binary signal into a 2-wire digital signal; and transferring the 2-wire digital signal to a twisted pair line.

4. A method for receiving analog voice channel signals and 4-wire digital signals via a 2-wire digital signal which can be transferred over a single twisted pair line, comprising:

receiving the 2-wire digital signal;

converting the 2-wire digital signal into a higher rate binary signal;

separating a first binary signal and a second binary signal from the higher rate binary signal;

converting the first binary signal into a first analog voice channel signal and a second analog voice channel for transmission to subscriber equipment; and converting the second binary signal into a first 4-wire digital signal and a second 4-wire digital signal for transmission to subscriber equipment.

* * * * *